United States Patent
Mikashima et al.

(10) Patent No.: US 7,536,317 B2
(45) Date of Patent: May 19, 2009

(54) SYSTEM FOR RECEIVING ORDER FOR OUTPUT OF IMAGE DATA

(75) Inventors: Katsuo Mikashima, Wakayama (JP); Fumihiro Nakahara, Wakayama (JP); Mikiya Seto, Wakayama (JP); Takashi Masui, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 466 days.

(21) Appl. No.: 11/063,527

(22) Filed: Feb. 24, 2005

(65) Prior Publication Data

US 2005/0197925 A1 Sep. 8, 2005

(30) Foreign Application Priority Data

Mar. 5, 2004 (JP) ............................. 2004-063027

(51) Int. Cl.
*G06Q 30/00* (2006.01)
(52) U.S. Cl. ............................. 705/26; 705/1; 705/27; 358/1.15; 358/1.18; 355/40
(58) Field of Classification Search ............ 705/26, 705/27, 1; 358/1.9, 1.15, 1.18; 382/306; 715/517; 355/40
See application file for complete search history.

(56) References Cited

U.S. PATENT DOCUMENTS

| | | | | |
|---|---|---|---|---|
| 6,055,037 A * | 4/2000 | Miyawaki | ................... | 355/40 |
| 6,456,391 B1 * | 9/2002 | Miyamoto et al. | ......... | 358/1.18 |
| 6,690,843 B1 * | 2/2004 | Squilla et al. | ............... | 382/306 |
| 6,891,595 B2 * | 5/2005 | Oka et al. | ...................... | 355/40 |
| 7,142,318 B2 * | 11/2006 | Lopez et al. | ............... | 358/1.15 |
| 2001/0019416 A1 * | 9/2001 | Monty et al. | .................. | 358/1.9 |
| 2004/0139398 A1 * | 7/2004 | Testa et al. | ................... | 715/517 |
| 2004/0174562 A1 * | 9/2004 | Edwards | .................... | 358/1.18 |

* cited by examiner

*Primary Examiner*—Yogesh C Garg
(74) *Attorney, Agent, or Firm*—Studebaker & Brackett PC; Donald R. Studebaker (57) ABSTRACT

In the order receiving system of the invention, a read/record controller reads image data from a memory card, produces uniquely recognizable ID information and stores the image data in a memory in association with the ID information. An order form issue section issues the user with an order form including the ID information, a thumbnail of the image data associated with the ID information and a blank field for entry of order information on the image data corresponding to the thumbnail. A scanner reads the ID information and order information from the order form filled with the order information by the user. A readout controller stores the order information in the memory in association with the image data corresponding to the ID information.

4 Claims, 8 Drawing Sheets

SYSTEM FOR RECEIVING ORDER FOR OUTPUT OF IMAGE DATA

CROSS-REFERENCE TO RELATED APPLICATIONS

This application claims priority under 35 U.S.C. §119 on Patent Application No. 2004-63027 filed in Japan on Mar. 5, 2004, the entire contents of which are hereby incorporated by reference.

BACKGROUND OF THE INVENTION

The present invention relates to a system for receiving an order for output of image data taken with a digital camera and the like (an order for photo prints, an order for recording image data to another recording medium and the like).

In recent years, services of printing as photos image data taken with digital cameras and camera-equipped mobile phones and recording such data in recording media such as CD-R, for example, have become prevalent.

In the early days of the prevalence of the above services, the user brought a recording medium having image data taken with a digital camera and the like recorded therein to a service shop asking for printing of the data. The service shop, keeping the recording medium with them temporarily, read the image data from the recording medium, printed the data as photos, and returned the recording medium to the user together with the printed photos.

The above service has the following problem. It is no way to check information on a digital recording medium, such as the number of images recorded, from the recording medium unless such information is visualized with a reader. Moreover, image data can be easily written in/deleted from the digital recording medium. Therefore, when a trouble related to data arose between the user and the service shop, it was difficult to clarify which was responsible for the trouble. Also, many users desired return of their memory cards upon completion of ordering.

To avoid the above problem, presently, an in-shop receiving machine is often used, in which the entire handling of image data until completion of ordering is left to the user. A flow of the order processing with such an in-shop receiving machine is roughly as follows.

The user inserts a recording medium having image data recorded therein into an in-shop receiving machine. According to instructions displayed on the monitor of the machine, the user specifies image data of which printing is desired, together with the size, the number of copies and the like of the image data. The receiving machine reads the specified image data from the recording medium, stores the read image data therein together with the other specified conditions, and issues an order receipt to the user. The user receives the order receipt and the returned recording medium. The image data and the conditions stored in the receiving machine are transferred to a photo processor, where printing of the image data is performed based on the conditions. At a later date, the user receives photo prints in exchange for the order receipt at the shop.

In the order processing with the in-shop receiving machine described above, the user must go through the series of operation including inserting a recording medium into the receiving machine, checking images and entering order conditions for printing. Therefore, one user tends to occupy the receiving machine for a considerably long time, resulting in that other users must queue up in front of the receiving machine or some users who desire ordering may give up ordering, in not a few cases. In particular, such a machine is less likely to be accepted by users who are poor at machine operation, and also, has the risk of causing wrong ordering and damage to the machine due to misoperation.

SUMMARY OF THE INVENTION

An object of the present invention is providing a system capable of performing order processing smoothly.

The order receiving system of the present invention is a system for receiving an order for output of image data, including an order form issue terminal. The order form issue terminal includes a first record controller and an issue section. The first record controller reads image data recorded in a recording medium presented by a user and stores the image data in a memory in association with uniquely recognizable ID information. The issue section issues an order form to the user. The order form has a region showing the ID information.

In the system described above, once image data recorded in a recording medium of one user is read and stored in the memory and an order form is issued to the user, the system can stop the reception processing for this user temporarily and can proceed to similar reception processing for the next user. In the conventional in-shop receiving machine, order reception processing for the next user is allowed only after the current user goes through various machine operations such as confirming images and entering various order conditions for printing. In this respect, the inventive system can shorten the time during which one user occupies a given terminal (the in-shop receiving machine conventionally, and the order form issue terminal in the present invention) compared with the conventional in-shop receiving machine, and thus smooth order reception processing can be attained.

Preferably, the order form further has a region showing a thumbnail of the image data associated with the ID information and a region urging the user to enter order information on the image data associated with the ID information. The order information includes information indicating whether or not output of the image data is desired. The order receiving system further includes an order form reception terminal. The order form reception terminal includes a readout section and a second record controller. The readout section reads ID information and order information from an order form presented by a user. The second record controller stores the order information read by the readout section in the memory in association with image data stored in the memory in association with the ID information read by the readout section.

In the order receiving system described above, the user receives an order form having a thumbnail of image data and a region for entering order information on the image data from the order form issue terminal. Hence, the user is relieved of the necessity of selecting image data for which output order is desired and determining various order conditions such as the number of copies in front of the order form issue terminal. This shortens the time taken for one user to occupy a given terminal (the in-shop receiving machine conventionally, and the order form issue terminal according to the present invention) compared with the case of the conventional in-shop receiving machine, and thus smooth order reception processing is attained. Also, the user (in particular, a user who is poor at machine operation) can select desired image data and determine various order conditions such as the number of copies of the selected image data at ease without being conscious of pressure from other users waiting for their turns behind the user. When the order form is of a paper medium, the user is only required to fill given regions with order information such as specifying image data for which output order is desired and the number of copies of the image data with a writing instrument. This can lessen inhibitions the user who is poor at machine operation might have held against the conventional in-shop receiving machine. In the end, this may lead to activating demands for prints from digital cameras like those from the conventional film cameras.

The user who has filled in the order form with order information on the image data presents the order form to the order form reception terminal, not the order form issue terminal. The order form reception terminal performs processing according to the information entered in the order form presented by the user. In such a receiving system having the order form issue terminal and the order form reception terminal provided separately, processing for one user with the order form issue terminal can be performed in parallel with processing for another user with the order form reception terminal.

Preferably, the order receiving system described above further includes an order form reception terminal. The order form reception terminal includes a recognition section, a presentation section, an entry urging section and a third record controller. The recognition section recognizes ID information presented by a user. The presentation section presents a thumbnail of image data stored in the memory in association with the ID information recognized by the recognition section. The entry urging section urges the user to enter order information on the image data corresponding to the thumbnail presented by the presentation section. The third record controller stores the order information entered by the user in the memory in association with the image data stored in the memory in association with the ID information recognized by the recognition section. The order information includes information indicating whether or not output of the image data is desired.

Preferably, the order form reception terminal further includes a deletion section. The deletion section deletes image data associated with given order information read from the readout section, or given order information entered by the user, from the memory when the given order information includes information indicating that output of the image data is not desired.

Preferably, the output of image data is processing of printing the image data on a paper medium (photo print processing).

Preferably, the output of image data is processing of storing the image data in a recording medium different from the recording medium presented by the user.

According to the present invention, the time during which one user occupies a given terminal (the in-shop receiving machine conventionally, and the order form issue terminal in the present invention) can be shortened compared with the case of the conventional in-shop receiving machine, and thus smooth order reception processing can be attained.

The user can make an output order without inhibitions against machine operation. The service shop can receive output orders without worrying about occurrence of a trouble on handling data of the user. It is therefore possible to activate demands for prints from digital cameras like those from the conventional film cameras.

DESCRIPTION OF THE PREFERRED EMBODIMENTS

Hereinafter, preferred embodiments of the present invention will be described with reference to the accompanying drawings. The same or equivalent components throughout the drawings are denoted by the same reference numerals, and the description thereof is not repeated.

Embodiment 1

Entire Configuration of Order Receiving System

Figure 1:
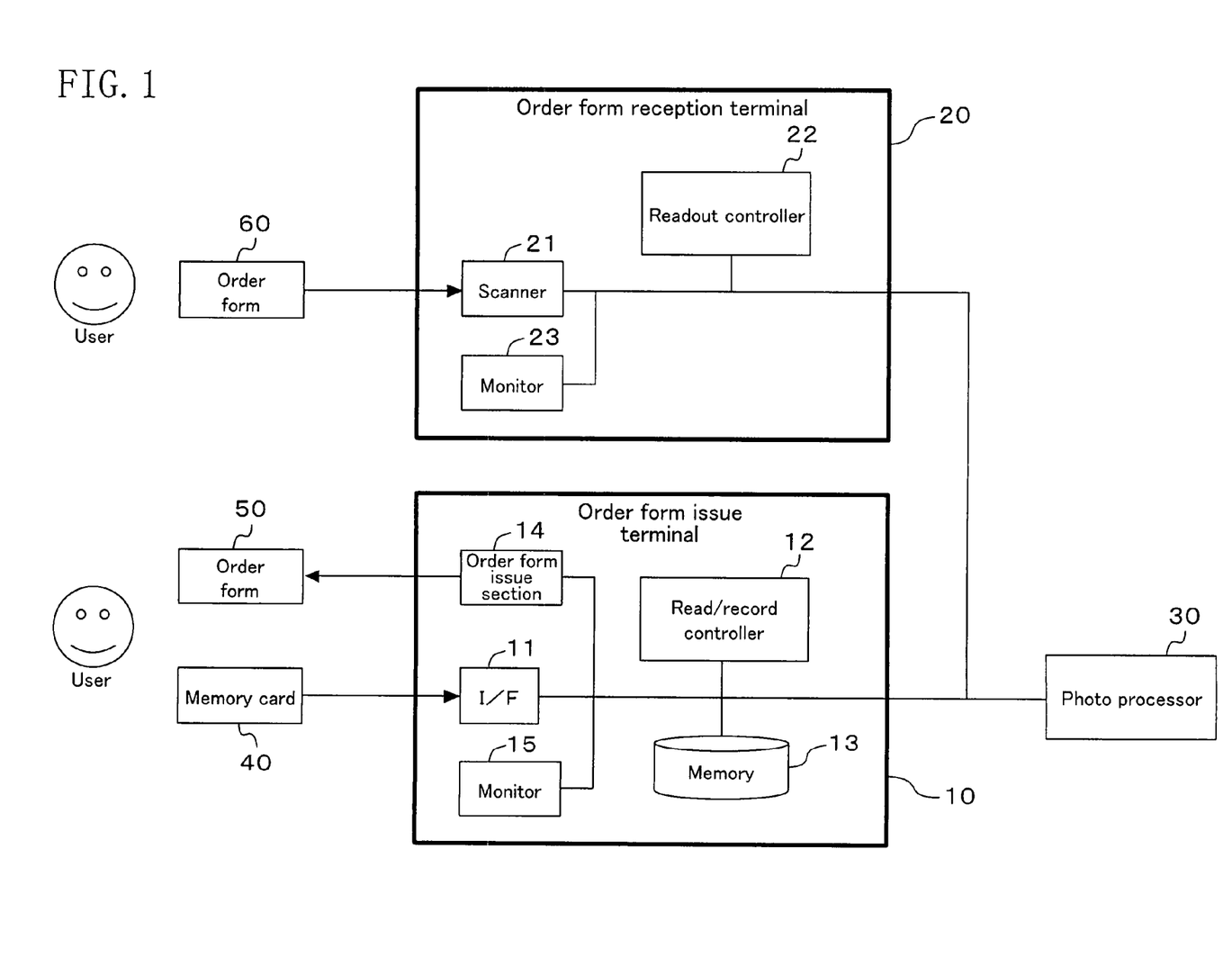
FIG. 1 is a block diagram of an entire order receiving system of Embodiment 1 of the present invention.

FIG. 1 shows the entire configuration of an order receiving system of Embodiment 1 of the present invention. The order receiving system may be installed in service shops that receive orders for outputting image data taken with digital cameras, camera-equipped mobile phones and the like (orders for printing such data, orders for recording such data in other recording media, and the like). For example, the system may be installed in photo labs, convenience stores and the like. The system includes an order form issue terminal 10, an order form reception terminal 20 and a photo processor 30. Only the order form issue terminal 10 and the order form reception terminal 20 may be installed in a shop, and necessary data may be exchanged between these terminals and the photo processor 30 installed in another place via a network or via a recording medium.

Internal Configuration of Order Form Issue Terminal 10

The order form issue terminal 10 includes an interface 11, a read/record controller 12, a memory 13, an order form issue section 14 and a monitor 15.

The interface 11, which may be in the form of a card slot, a disk drive or the like, for example, serves as an interface for reading image data from a recording medium (a memory card in the illustrated example) 40 of a user who wants to order output of the image data.

The read/record controller 12 reads the image data from the memory card 40 via the interface 11, produces uniquely recognizable ID information, and stores the image data in the memory 13 in association with the produced ID information.

Once the image data has been stored in the memory 13, the order form issue section 14 prepares and issues an order form 50 to the user. The order form 50 includes the ID information produced by the read/record controller 12, thumbnails of the image data stored in the memory 13 in association with the ID information, and blank fields for entering order information on the image data corresponding to the thumbnails.

The monitor 15 displays information for assisting the user who uses the order form issue terminal 10. Examples of such information include information for guiding the operation to be done by the user, such as "Please insert a memory card into the slot", "Do not pull out the memory card presently", "Please pull out the memory card" and "Please receive the order form", and information such as "Wait for a while. . . . An order form is now being prepared." and "We failed to receive the order due to insufficient capacity of the memory."

Internal Configuration of Order Form Reception Terminal 20

The order form reception terminal 20 includes a scanner 21, a readout controller 22 and a monitor 23.

The scanner 21 reads the ID information and order information from an order form 60 filled with the order information entered by the user.

The readout controller 22 stores the order information read with the scanner 21 in the memory 13 in association with the image data that has been stored in the memory 13 in association with the ID information read with the scanner 21.

The monitor 23 displays information for assisting the user who uses the order form reception terminal 20. Examples of such information include information for guiding the operation to be done by the user, such as "Please set an order form" and "Please receive the order form", and information such as "Wait for a while. . . . The order form is now being read."

Flow of Processing by Order Receiving System

Figure 2:
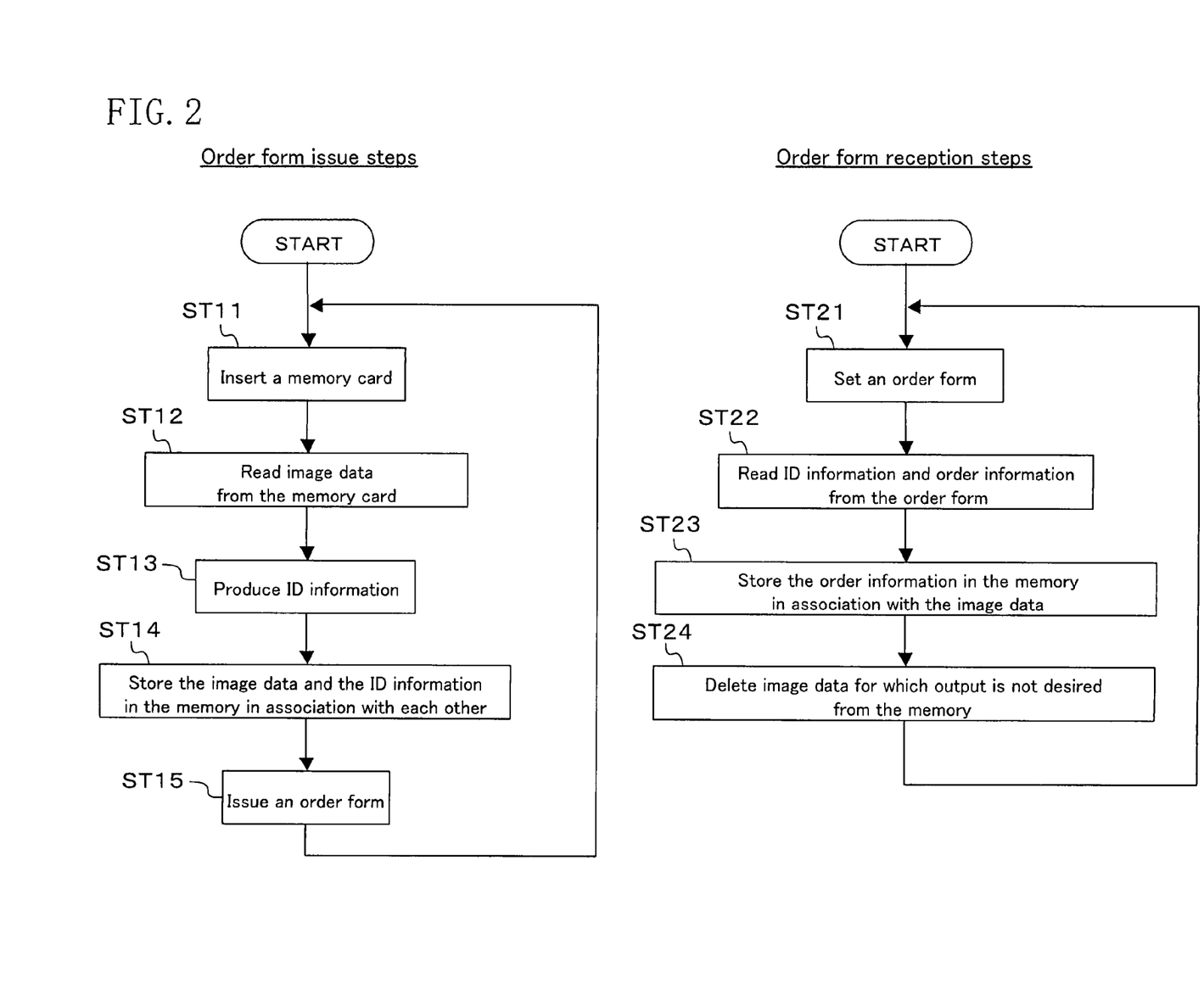
FIG. 2 is a flowchart showing a flow of processing by the order receiving system of FIG. 1.

The order reception processing performed by the system having the configuration described above will be described with reference to FIG. 2. As shown in FIG. 2, the processing performed by the system is largely separated into order form issue steps ST11 to ST15 and order form reception steps ST21 to ST24, which are respectively executed in the order form issue terminal 10 and the order form reception terminal 20. The order form issue steps ST11 to ST15 and the order form reception steps ST21 to ST24 can be executed in parallel to each other. These steps will be described specifically.

Order Form Issue Steps

<ST11>

A user who wants to order output of image data taken with a digital camera brings a memory card 40 having the image data stored therein to a shop. The user inserts the memory card 40 into the card slot 11 of the order form issue terminal 10 installed in the shop.

<ST12>

Figure 3:
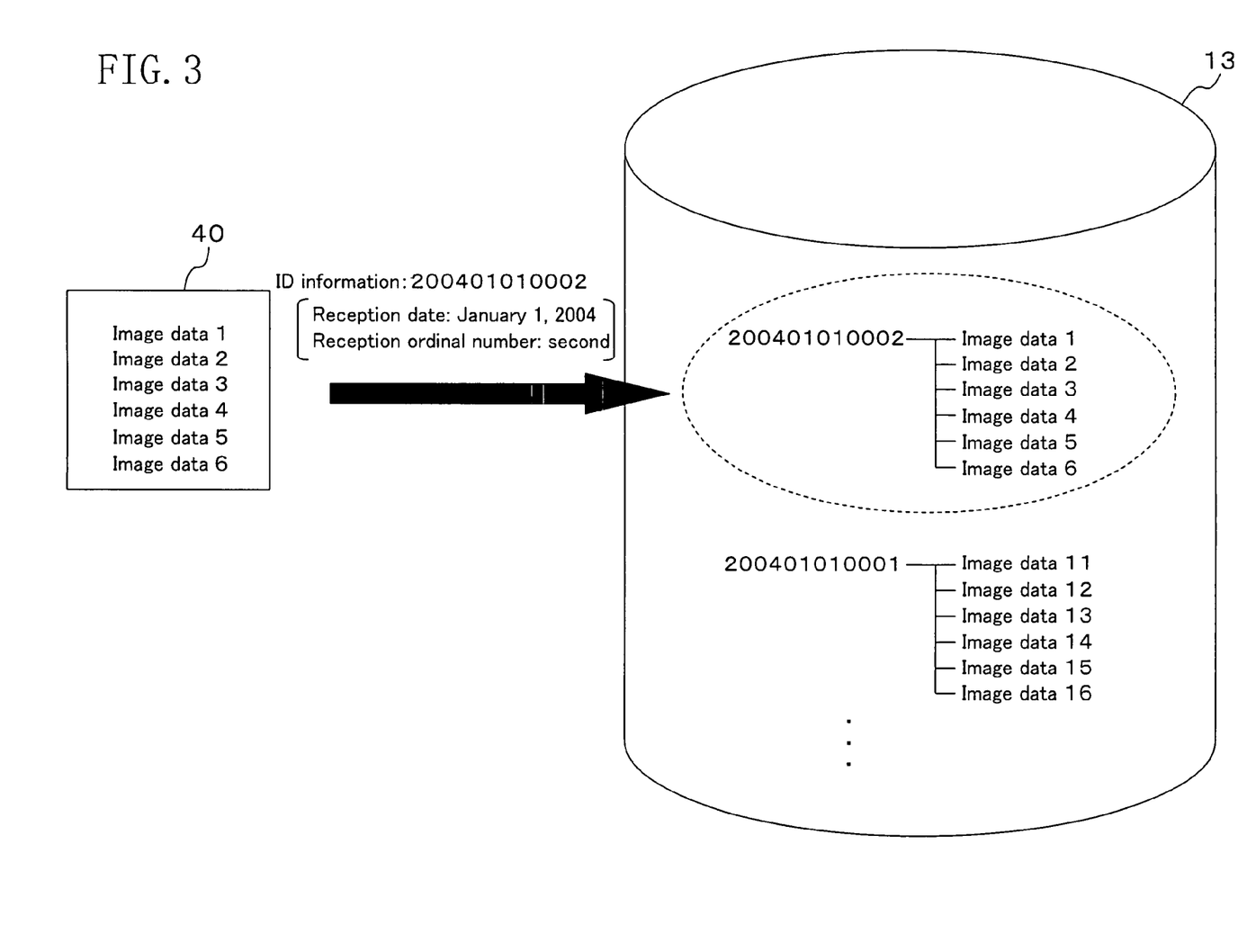
FIG. 3 is a view for demonstrating processing of storing image data from a memory card in a memory of an order form issue terminal.

Upon insertion of the memory card 40 into the card slot 11, the read/record controller 12 reads all of image data stored in the memory card 40. Herein, assume that image data items 1 to 6 are stored in the memory card 40 as shown in FIG. 3. The read/record controller 12 reads the image data items 1 to 6 stored in the memory card 40. The monitor 15 displays "Any other recording medium having image data to be output?" The user selects "Yes" or "No" via a touch panel or the like. Assume that the user selects "No".

In the illustrated case, the image data items 1 to 6 are stored in one memory card 40. If the image data items 1 to 6 are stored over a plurality of recording media separately, the flow of processing will be as follows. The user inserts one of a plurality of recording media 40 (for example, memory card A) into the slot of the order form issue terminal 10. Image data (for example, items 1 to 3) are read from the memory card A. For the monitor display of "Any other recording medium having image data to be output?" the user selects "Yes". The user pulls out the memory card A and then inserts another recording medium (for example, memory card B) into the slot of the order form issue terminal 10. Image data (for example, items 4 to 6) are read from the memory card B. This processing is repeated if there is yet another recording medium. If there is no more recording medium, the user selects "No" for the monitor display of "Any other recording medium having image data to be output?"

<ST13>

While reading the image data items 1 to 6, the read/record controller 12 produces uniquely recognizable ID information for the data. The ID information, for distinguishing the currently read image data items 1 to 6 from other image data, is produced so as not to overlap with ID information prepared for other image data. In the example of FIG. 3, the ID information is produced using the reception date (that is, the date on which the image data items 1 to 6 are read from the memory card 40) and the reception serial number on the reception date (that is, the ordinal number for the read processing of the image data items 1 to 6 from the memory card 40 counted from the start of the reception date). Specifically, assuming that the reception date is Jan. 1, 2004 and the read processing of the image data items 1 to 6 is the second read processing on Jan. 1, 2004, "200401010002" is produced as the ID information. Thus, one unique ID number is produced for the image data items 1 to 6 even when the image data is read from a plurality of recording media 40 (for example, the image data items 1 to 3 are read from one memory card A while the image data items 4 to 6 are read from another memory card B). Alternatively, an order number retrieved from a barcode, a POS system and the like, the reception date and time, user ID and the like may be used for production of ID information.

<ST14>

The read/record controller 12 then prepares a folder having a folder name of the ID information "200401010002" in the memory 13 and stores the image data items 1 to 6 in the folder, as shown in FIG. 3.

<ST15>

Figure 4:
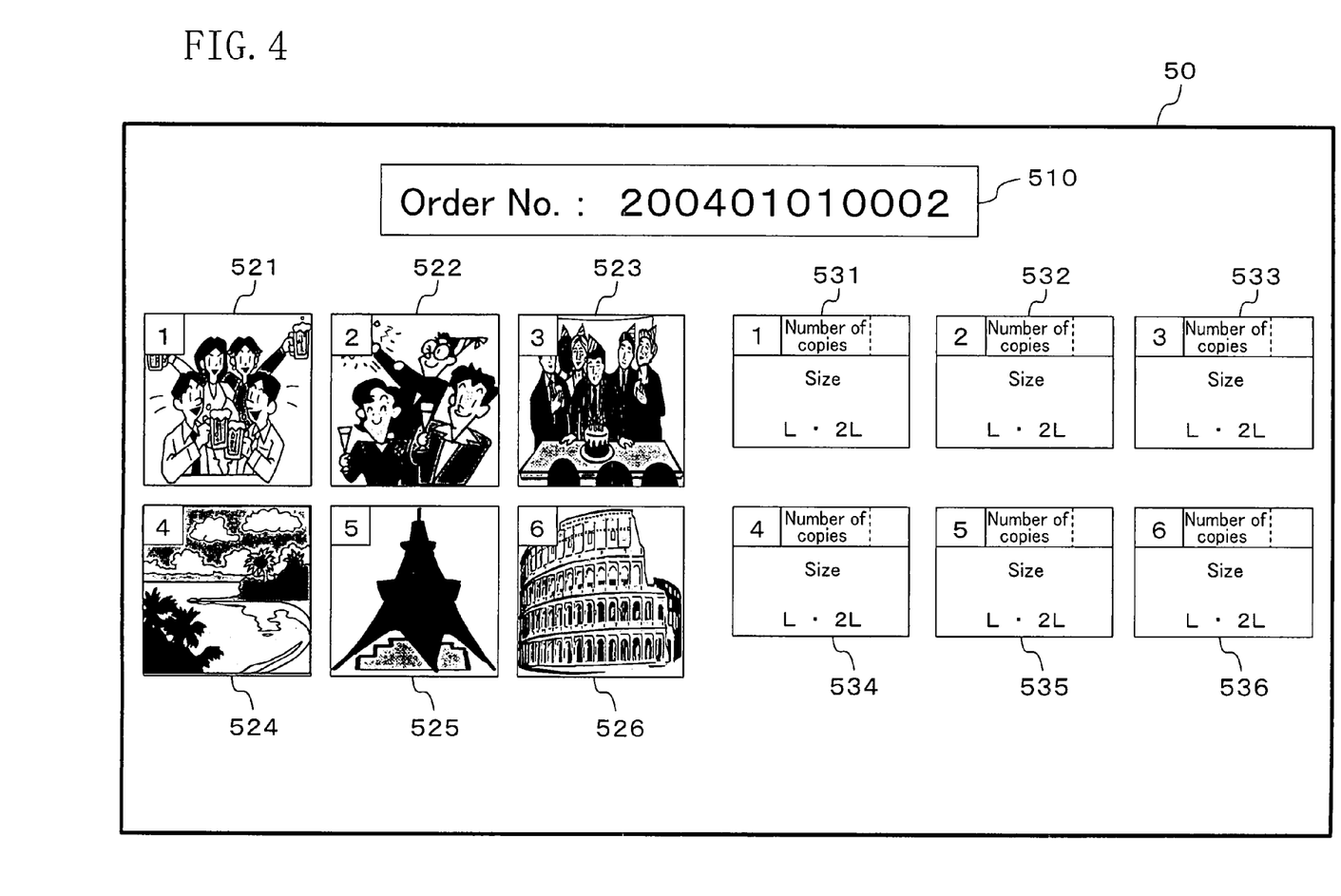
FIG. 4 is a view showing an exemplary order form issued to the user by the order form issue terminal.

The order form issue section 14 prepares and issues an order form 50 as shown in FIG. 4 to the user. The order form 50 includes a region 510 showing ID information, regions 521 to 526 showing thumbnails of image data stored in the memory 13 in association with the ID information, and regions 531 to 536 for entering order information for the image data corresponding to the thumbnails. In the illustrated example, the ID information "20040101002" is shown in the region 510. Thumbnails of the image data items 1 to 6 are shown in the regions 521 to 526, with the numbers 1 to 6 for identifying the thumbnails given in the upper left corners thereof. The regions 531 to 536 have blank fields prepared for the user to enter order information on the image data items 1 to 6 (the number of copies and the size in the illustrated example). The region 531 is a region prepared for the user to enter order information on the image data item 1 corresponding to the thumbnail shown in the region 521. To make this apparent for the user, the same number "1" as the number given in the upper left corner of the thumbnail is given in the upper left position of the region 521. This also applies to the regions 532 to 536. In the illustrated example, a blank field urging the user to enter the "number of copies" and a blank field urging the user to select the "size" are given in each of the regions 531 to 536. The user is required to enter a desired figure for the "number of copies", and to encircle a desired one of the given sizes, L and 2L. Entering 1 or a larger figure in the blank field for the "number of copies" indicates that the user desires an output order. Entering 0 or leaving it blank indicates that the user desires no output order.

Once the processing of issue of the order form 50 is finished, the monitor 15 displays "All the processing has been finished. Please pull out the memory card and receive the order form. After entering your order information in the order form, please move to the order sheet reception terminal."

The user receives the memory card 40 and the order form 50. The order form issue terminal 10 now completes all the processing to be performed for this user, and then is ready for processing for the next user.

Order Form Reception Steps

Figure 5:
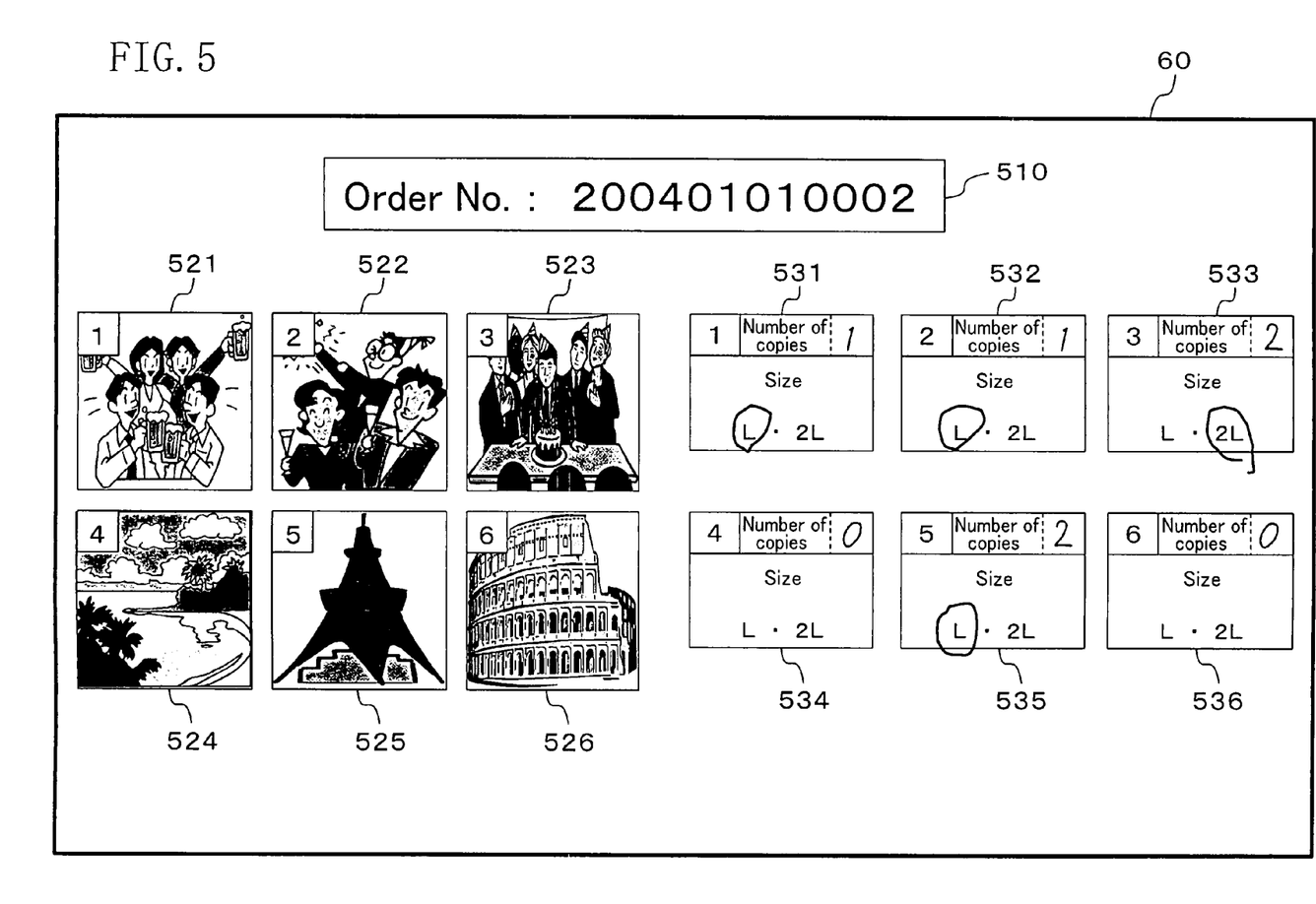
FIG. 5 is a view showing an exemplary order form filled with order information by the user.

The processing performed with the order form reception terminal 20 will be described assuming that the user has entered order information in the order form 50 as shown in FIG. 5.

<ST21>

The user sets the order form 60 filled with the order information as shown in FIG. 5 on the scanner 21.

<ST22>

The scanner 21 reads the ID information "200401010002" shown in the region 510 of the order form 60 and the order information entered in the regions 531 and 536. The scanner 21 outputs "200401010002" as a result of the readout of the ID information, and also outputs "the number of copies 1, size L" "the number of copies 1, size L", "the number of copies 2, size 2L", "the number of copies 0", "the number of copies 2, size L" and "the number of copies 0" as a result of the readout of the order information on the image data items 1, 2, 3, 4, 5 and 6, respectively.

<ST23>

The readout controller 22 stores the order information read with the scanner 21 in the memory 13 in association with the image data items 1 to 6 stored in the folder named "200401010002".

<ST24>

Figure 6:
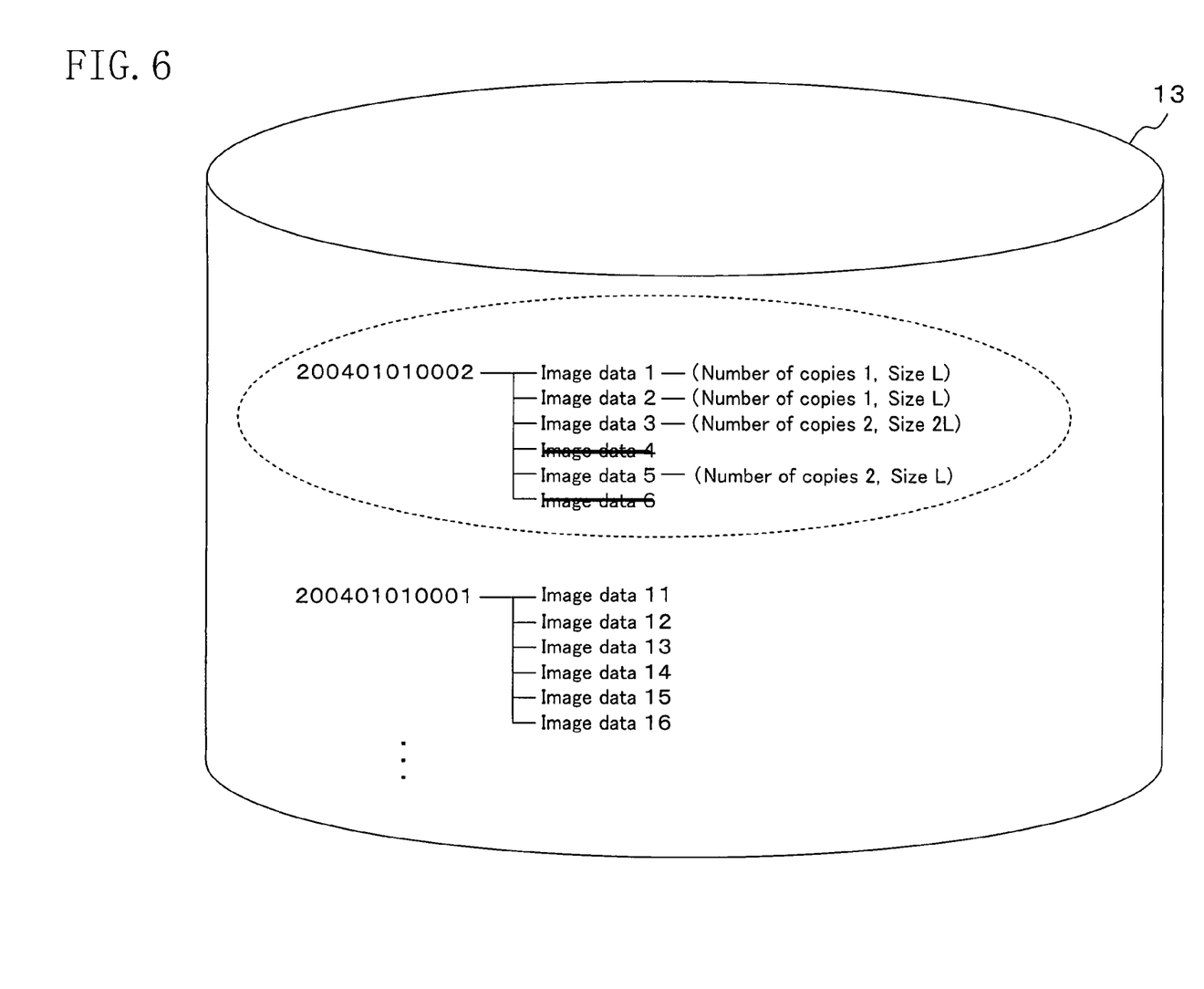
FIG. 6 is a view showing how the order information read from the order form is stored in the memory in association with the image data.

The readout controller 22 determines that no output order has been made by the user for the image data items 4 and 6 for which "the number of copies 0" was output as a result of the readout of the order information with the scanner 21, and deletes the image data items 4 and 6 from the memory 13, as shown in FIG. 6. The readout controller 22 also determines that no output order has been made by the user for an image data item for which "the number of copies (blank)" was output as a result of the readout of the order information with the scanner 21, and deletes the corresponding image data item from the memory 13.

Once the above processing is finished, the monitor 23 displays "All the processing has been finished. Please keep the order form with you. Photo prints will be available on (date), and be delivered in exchange for the order form."

The order form reception terminal 20 now completes all the processing to be performed for this user, and then be ready for processing for the next user.

Output Processing with Photo Processor 30

Once the processing with the order form reception terminal 20 is completed, the image data items 1 to 6 and the relevant order information stored in the folder "200401010002" are sent to the photo processor 30 from the memory 13. The photo processor 30 performs output processing (printing as photos or recording into another recording medium) according to the information supplied. The folder "200401010002" in the memory 13 is deleted upon completion of the output processing by the photo processor 30.

Billing Processing

The following two cases are assumed as the use style of the order receiving system described above. One is the case that the customer performs all operations with the order form issue terminal 10 and the order form reception terminal 20, and the other is the case that a salesclerk receives the recording medium 40 from the customer and operates the order form issue terminal 10 and the order form reception terminal 20. In each case, billing the customer can be made in the following manner.

In the case that the customer performs all operations with the order form issue terminal 10 and the order form reception terminal 20, the system displays the charge amount calculated based on the order information on the monitor 23, urging the customer to put money of the amount in a slot (not shown), at the time after the order information has been read in the order form reception steps (after the step ST22 in FIG. 2). The subsequent processing (in and after the step ST23) is performed only after it is confirmed that the charge has been paid.

In the case that the salesclerk receives the recording medium 40 from the customer and operates the order form issue terminal 10 and the order form reception terminal 20, the above way of billing may be adopted, or the salesclerk may obtain information on the customer such as the name and where to make contact (by asking the customer to write down his or her name and where to make contact on the order form and receiving the copy thereof) and bill the customer at the delivery of the prints.

Effect

As described above, in the order receiving system of Embodiment 1, the user receives the order form 50 having thumbnails of image data and blank fields for order information to be filled by the user from the order form issue terminal 10. Hence, the user is relieved of the necessity of selecting image data for which output order is desired and determining various order conditions such as the number of copies in front of the order form issue terminal 10. This shortens the time taken for one user to occupy a given terminal (the order form issue terminal 10 in this embodiment, and the in-shop receiving machine conventionally) compared with the case of the conventional in-shop receiving machine, and thus smooth order reception processing is attained.

Also, the user (in particular, a user who is poor at machine operation) can select desired image data and determine various order conditions such as the number of copies of the selected image data at ease without being conscious of pressure from other users waiting for their turns behind the user.

With the order form 50 of a paper medium, the user is only required to fill given regions with order information such as specifying image data for which output order is desired and the number of copies of the image data with a writing instrument. This can lessen inhibitions the user who is poor at machine operation might have held against the conventional in-shop receiving machine. In the end, this may lead to activating demands for prints from digital cameras like those from the conventional film cameras.

The user who has entered order information on the image data moves to the order form reception terminal 20, not the order form issue terminal 10, to present the filled order form 60 to the terminal 20. The order form reception terminal 20 performs processing according to the information entered in the presented order form 60. In such a receiving system having the order form issue terminal 10 and the order form reception terminal 20 provided separately, processing for one user with the order form issue terminal 10 can be performed in parallel with processing for another user with the order form reception terminal 20.

Embodiment 2

Figure 7:
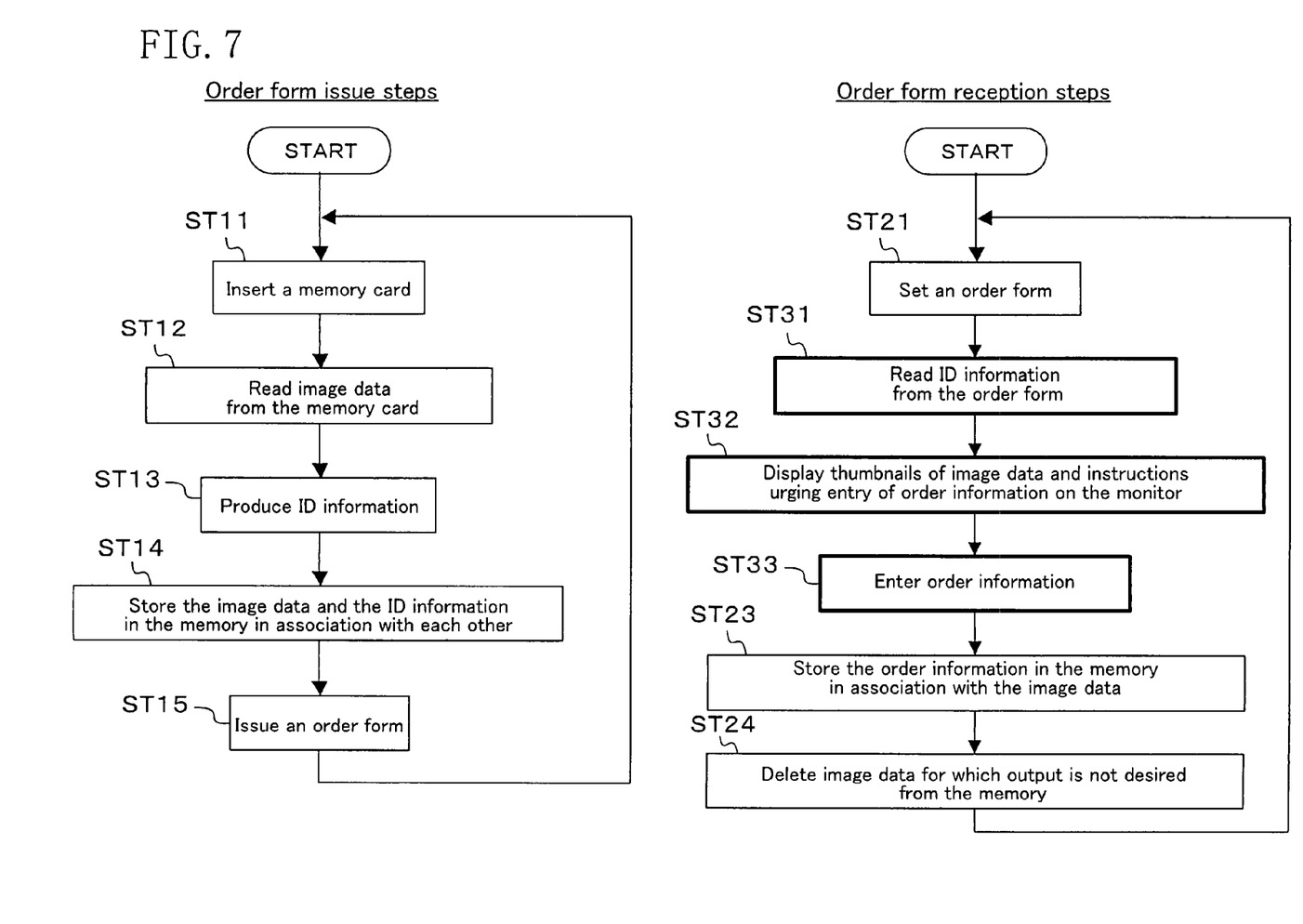
FIG. 7 is a flowchart showing a flow of processing by an order receiving system of Embodiment 2.

The entire configuration of an order receiving system of Embodiment 2 of the present invention is the same as that described in Embodiment 1, except for the format of the order form 50 issued by the order form issue terminal 10 and part of the processing performed by the order form reception terminal 20. Hereinafter, the different points are mainly described with reference to the flowchart of FIG. 7.

Order Form Issue Steps

Processing in steps ST11 to ST15 is performed as in Embodiment 1, issuing an order form (order sheet) 50 to the user. The order form 50 only has the region 510 for showing ID information. The regions 521 to 526 for showing thumbnails and the regions 531 to 536 for entering order information shown in FIG. 4 are not provided. Assume that ID information "200401010002" is given as the order number, as in Embodiment 1.

Order Form Reception Steps

<ST21>
The user sets the order form 60 on the scanner 21.

<ST31>
The scanner 21 reads the ID information "200401010002" shown in the region 510 of the order form 60.

Figure 8:
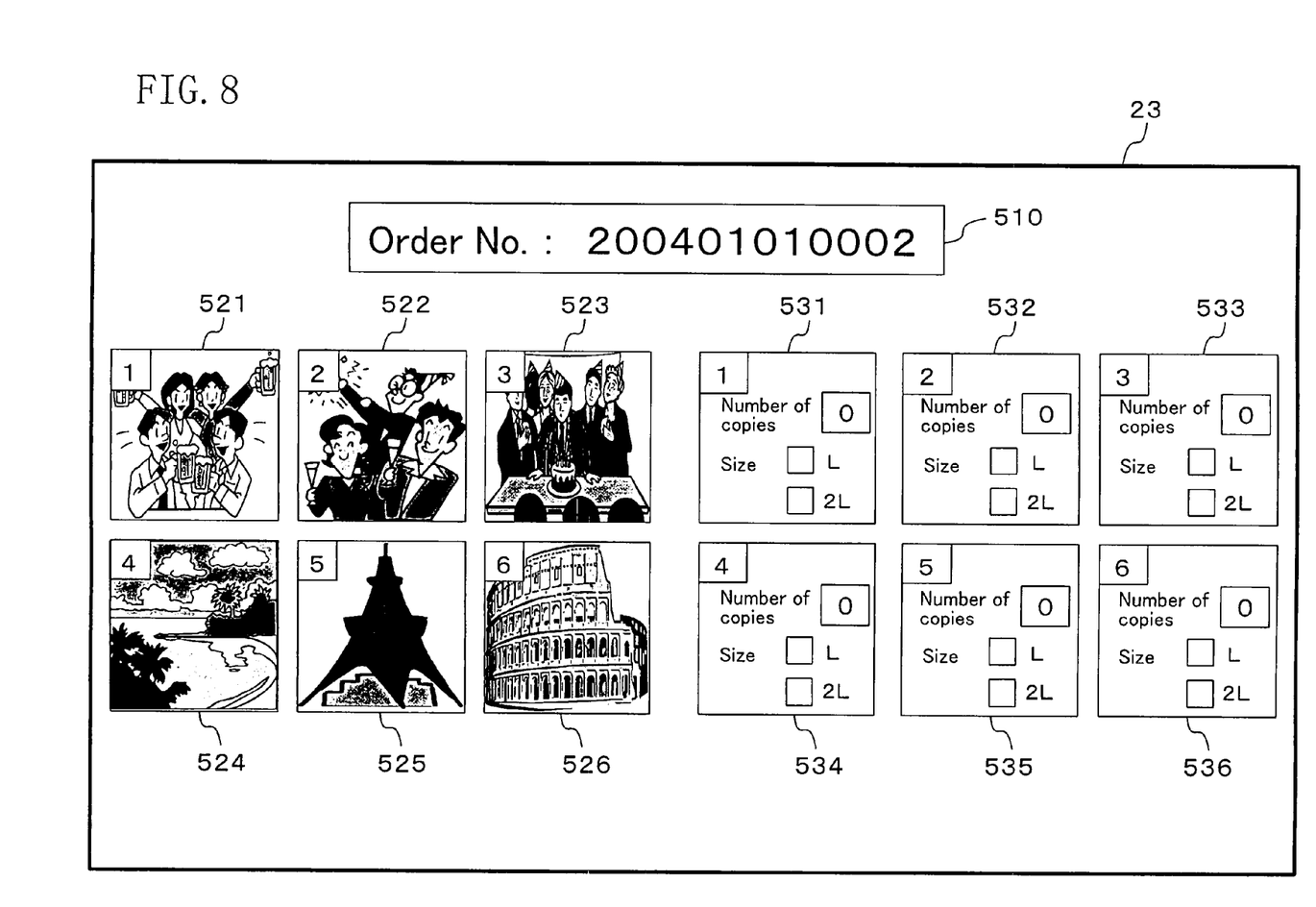
FIG. 8 is a view showing an exemplary order entry screen displayed on a monitor of an order form reception terminal in the order receiving system of Embodiment 2.

<ST32>
The readout controller 22 displays an order information entry screen, as shown in FIG. 8, having a region 510 for showing the ID information read by the scanner 21, regions 521 to 526 showing thumbnails of image data stored in the memory 13 in association with the ID information, and regions 531 to 536 for urging entry of order information for the image data corresponding to the thumbnails. In the example of FIG. 8, the ID information "20040101002" is displayed in the region 510 as the order number. The thumbnails of the image data items 1 to 6 are displayed in the regions 521 to 526, with the numbers 1 to 6 for identifying the thumbnails given in the upper left corners thereof. The regions 531 to 536 have boxes prepared for the user to enter order information on the image data items 1 to 6 (the number of copies and the size in the illustrated example). The region 531 is a region prepared for the user to enter order information on the image data item 1 corresponding to the thumbnail shown in the region 521. To make this apparent for the user, the same number "1" as the number given in the upper left corner of the thumbnail is given in the upper left position of the region 521. This also applies to the regions 532 to 536. In the illustrated example, a box urging the user to enter the "number of copies" and a box urging the user to select the "size" are given in each of the regions 531 to 536. The user is required to enter a desired figure for the "number of copies" via a numeric keypad or the like, and to click a check box corresponding to the desired one of the displayed sizes L and 2L with a mouse. Entering 1 or a larger figure in the box for the "number of copies" indicates that the user desires an output order. Entering 0 indicates that the user desires no output order.

<ST33>
The user enters desired order information on the order entry screen displayed on the monitor 23.

<ST23>
Upon completion of the entry of the order information by the user, the readout controller 22 receives the order information entered in the regions 531 to 536 of the order entry screen 23, and stores the order information in the memory 13 in association with the image data items 1 to 6 stored in the folder named "200401010002".

<ST24>
The readout controller 22 determines that no output order has been made by the user for the image data for which the order information on the number of copies is "0", and deletes such image data from the memory 13.

Thereafter, the output processing by the photo processor 30 is performed as in Embodiment 1.

Alteration

In the above embodiment, the ID information on the order form 60 was read with the scanner 21 in the steps ST21, ST31 and ST32. Alternatively, the ID information may be read in the following manner. A screen urging the user to enter the ID information is displayed on the monitor 23. The user enters the ID information via a keypad, a touch panel or the like, and the readout controller 22 recognizes the entered ID information. The readout controller 22 then displays the order information entry screen, as shown in FIG. 8, having the region 510 showing the recognized ID information, the regions 521 to 526 displaying thumbnails of image data stored in the memory 13 in association with the ID information, and the regions 531 to 536 for urging entry of order information on the image data corresponding to the thumbnails.

The order receiving system of the present invention can provide smooth flowing of the order reception processing compared with the conventional in-shop receiving machine. The user can make an order without inhibitions against machine operation. The service shop can receive output orders without worrying about occurrence of a trouble on handling data of the user. Thus, it can be expected that demands for prints from digital cameras will be activated like those from the conventional film cameras.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:
1. An order receiving system comprising:
an order form issue terminal;
an order form reception terminal; and
a photo processor, wherein
the order form issue terminal comprises:
a first record controller configured to read image data recorded in a recording medium presented by a user and storing the image data in a memory in association with uniquely recognizable ID information; and an issue section configured to issue a single order form to the user in response to the image data being stored in the memory with the uniquely recognizable ID information, the single order form is of paper and needs to be scanned, the single order form has a region showing the ID information, a region showing a thumbnail of the image data associated with the ID information and a region prepared for the user to enter order information on the image data associated with the ID information, the order information includes information indicating whether or not output of the image data is desired, the order form reception terminal comprises:

a scanner in a readout section configured to scan said ID information and said order information from said single order form presented by a user; and a second record controller configured to store the order information scanned by the scanner in the memory in association with the image data stored in the memory in association with the ID information scanned by the scanner in the readout section;

the photo processor configured to perform output processing according to the order information stored in the memory by the second record controller and the image data stored in the memory in association with the ID information scanned by the scanner in the readout section;

wherein the order form issue terminal, the order form reception terminal, and the photo processor are electronically communicating with one another.

2. The order receiving system of claim 1, wherein the order form reception terminal further comprises a deletion section configured to delete image data associated with given order information read with the scanner from the memory when the given order information includes information indicating that output of the image data is not desired.

3. The order receiving system of claim 1, wherein the photo processor is configured to perform output processing of printing the image data on a paper medium.

4. The order receiving system of claim 1, wherein the photo processor is configured to perform output processing of storing the image data in a recording medium different from the recording medium presented by the user.

* * * * *